Patented Jan. 26, 1932

1,842,706

UNITED STATES PATENT OFFICE

FRANK O. WOODRUFF, OF QUINCY, MASSACHUSETTS, ASSIGNOR TO HARRY H. BECKWITH, OF BROOKLINE, MASSACHUSETTS

MANUFACTURE OF RUBBER-FIBER ARTICLES

No Drawing.     Application filed February 13, 1930. Serial No. 428,249.

This invention relates to the manufacture of rubber-fiber articles, using as raw materials a water-dispersed rubber, such as latex, and loose or unwoven fiber, such as cotton or chemical wood pulp. In producing such articles, it is sometimes the practice to beat the fiber in water to form a pulp, whereupon a water-dispersed rubber is incorporated into the pulp and is fixed to the fibers by the addition of suitable coagulating agents. The stock is then formed into the desired articles, as by moulding, or run off on a paper machine into sheets or boards. In carrying out such a process, not only is a comparatively large amount of dispersed rubber necessary to ensure a perfectly waterproof product, but it is difficult, if not impossible, to control coagulation so as to effect a complete envelopment of the fibers with rubber and at the same time to avoid the generation of rubber masses or aggregates. Sometimes the fibrous material is moulded into the desired article, or is formed into a paper or felt prior to impregnation with the aqueous rubber dispersion, whereupon drying of the impregnated fibrous structure is effected, but in such case, too, a comparatively large amount of rubber dispersion is necessary to produce a finished product which is completely resistant to the passage of water therethrough. Moreover, it is difficult to effect a uniform impregnation, particularly through a comparatively thick structure of interfelted fibers, and even when uniformity of impregnation is realized there is a tendency during the drying operation for the dispersed rubber particles to migrate to the surface of the sheet where evaporation of water is taking place.

An object of the present invention is to make possible the production, from raw materials such as described, of waterproof rubber-fiber articles in which the fibers are substantially uniformly coated with rubber and in the production of which a comparatively small amount of water-dispersed rubber is employed. In accordance with the present invention, fibrous material in a loose, more or less bulky condition is saturated, as by immersion, with an aqueous rubber dispersion, such as latex, whereupon excess dispersion is removed by squeezing. The fibrous material is then spread out and dried at room temperature conditions, or in a warm atmosphere if it is desired to accelerate the drying operation. The dried mass of rubberized fibers is then beaten in the presence of water to form an aqueous suspension of the fibers, whereupon the pulp is formed or moulded into the desired articles or is run off on a paper machine, e. g., a cylinder machine, into sheets or boards. The formed article is then dried, and is preferably compacted at elevated temperature to diminish porosity and to effect a more tenacious bond between the rubberized fibers.

In attaining the best products, I find it distinctly desirable that the fiber surfaces carry a suitable coagulating agent, so that when the dispersed rubber contacts therewith, coatings or envelopes of rubber are immediately deposited thereon. Only a trace of coagulating agent is necessary for this purpose, as it is not desired to effect a coagulation of more rubber than that necessary to produce comparatively thin coatings or envelopes on the fibers. Were excess coagulating agent present, there would be a tendency to produce rubber aggregates which would persist as such through the subsequent beating operation and appear in the finished product. Coagulating agents may be attached uniformly to the fiber surfaces by treating the fiber with such agents, preferably in aqueous solution, as this permits the fiber to be completely wetted with the solution. Excess solution may then be removed from the fiber, as by squeezing, whereupon the fiber may be dried so as to leave a residue of coagulating agent uniformly distributed over the fiber surfaces. Various water-soluble coagulating agents may be used, but it is preferable that the agents be of a type which do not chemically injure the fiber. Comparatively dilute solutions of the organic acids or weak acid salts are eminently suitable for this purpose. If the coagulating agent is normally liquid and volatile, such as acetic acid, the solution used for treating the fiber may be more concentrated than when the coagulating agent is normally solid and tends to precipitate or crystallize out of solution, since in the former case volatilization of the coagulating agent takes place along with the water during the drying of the fiber, whereas in the latter case the solution of coagulating agent present in the fiber becomes more concentrated as the water is removed, and tends to deposit the solid coagulating agent on the fibrous surfaces.

While a great many procedures falling within the purview of the present invention are possible, I shall cite, for the purpose of illustration, an example which was found to give eminently satisfactory rubber-fiber sheets. Cotton fiber in a loose, more or less fluffy condition resembling cotton batting, was immersed in a bath of a 5% acetic acid solution and allowed to remain therein until all the fibers were completely wetted with the solution. The acid-wetted fiber was then passed through a pair of rubber squeeze rolls to remove excess acid, whereupon the fiber was plunged into water and again squeezed free of excess acid solution. The initial treatment of the fiber with comparatively strong acid, followed by squeezing, a water plunge, and a second squeezing, ensures a uniform moistening of substantially all the fibers with acid sufficiently dilute to have no deleterious effect on the cellulose. The acid-treated fiber was then pulled apart and spread out as a thin layer and permitted to dry out at room temperature. Drying effects a vaporization of most of the acetic acid, as well as the water, but even when well-dried, the product is distinctly acid. The dried acid fiber was immersed in a bath of rubber latex with gentle stirring and picking apart of the fibers so as to effect the envelopment of all the fibers with the rubber latex. Coagulation of the rubber from the latex took place on the fibers only immediately at the surfaces of contact between the fibers and the latex. The fiber was removed from the latex bath carrying an excess of uncoagulated latex. This excess was eliminated by passing the fiber through rubber squeeze rolls, the squeezed out latex being substantially free from rubber agglomerates, so that it could be recovered and reused in the treatment of other fibrous material. The rubber-coated fibers were then spread out in a thin layer and dried at room temperature, as a result of which some of the fibers became loosely bonded together, although there were more or less rubberized fibers in individualized condition. The dried fiber had a rubber content of only about 20%, based on the dry weight of fiber, but this rubber content was so uniformly distributed over the fiber surfaces and so free from rubber aggregates that the fiber lacked a rubbery feel. About 350 parts by weight of the dried fiber was then introduced into a beater, together with sufficient water to ensure circulation. Beating was initiated with the beater roll sufficiently clearing the bed-plate so that the fibrous material was merely circulated with little, if any, actual manipulation of the fibers. The agitation or circulation of the material in the water was thus continued for a while to liberate the loosely bonded fibers, whereupon the beater roll was gradually lowered until a brushing or teasing out of the material into individualized fibers took place. The roll was maintained in this position for about four hours to ensure a complete individualization of the rubberized fibers. The roll was then raised to effect merely a circulation of the fiber suspension, whereupon 30 parts by weight of rosin size was added and circulation of the mass was continued for about fifteen minutes to ensure a uniform dissemination of the rosin size throughout the pulp. Fifty parts by weight of alum was then added and circulation was again continued for about fifteen minutes to ensure a complete precipitation of the rosin size on the fibers. The stock was then diluted to a consistency of about $\frac{1}{2}\%$ and run into a stuff chest, from whence it was delivered to a cylinder or wet machine and formed into sheets of a thickness of .011 of an inch. The sheets were dried and hot-calendered, and when tested by a Scott tensile strength tester were found to have the high tensile strength of 63 pounds per square inch. They possessed remarkable flexibility and resiliency, this latter characteristic being manifest by the snapback of a rolled sheet when the tension was released. The product was completely waterproof and had high dielectric strength. Such a product is serviceable for various uses where a combination of characteristics such as high strength, flexibility, resiliency, and waterproofness is desired. For instance, the product is suitable for use as a wall or floor covering, as an automobile top or furniture upholstering material, in the manufacture of shoe parts such as inner soles, and generally as an artificial leather. It may be surface-finished with suitable lacquers of the nitrocellulose variety and embossed to produce grain effects simulating those of a natural leather.

The example hereinbefore given is subject to considerable modification, depending upon the particular characteristics desired in the finished product. For example, a product made as hereinbefore described possesses more or less tackiness, but this property may be avoided, if desired, by vulcanization of the rubber component. To this end, the aqueous rubber dispersion may contain vulcanizing agents, such as sulphur, accelerators of vulcanization, and compounding agents such as zinc oxide, so that the dried product may be vulcanized under heat as during the hot-calendering operation. If desired, a so-called vulcanized latex may be employed, in which case more or less vulcanization will take place during the initial drying out of the latex-treated fiber, and later during the drying and hot-calendering of the sheet material. Or, if desired, the finished sheets may be vulcanized by exposure to an atmosphere of sulphur chloride vapors. While in the example given, the product contains only about 20% rubber, based on the weight of dry fiber, the content of rubber may be increased to about 50% or more to enhance waterproofness and other characteristics while at the same time avoiding the generation of rubber agglomerates. The rubber content of the finished product depends on the pressure of squeezing after saturation of the fibrous material with the aqueous rubber dispersion, so that by controlling the pressure of squeezing, the finished product may be made to possess the rubber content desired. If a colored product is desired, suitable dyes or pigments for both the rubber and the fiber may be added to the aqueous rubber dispersion before treatment of the fiber therewith. The term aqueous rubber dispersion is herein used in its comprehensive sense, and is meant to include artificial aqueous dispersions made from crude or reclaimed rubber, as well as a natural dispersion or latex. The rubber dispersion may be used at various solids contents, but the solids content of a natural latex, i. e., a solids content of about 30% to 35%, has been found to be satisfactory, as at this content the dispersion is sufficiently fluid to be easily brought into contact with substantially all the fibrous surfaces of a loose, more or less bulky, fibrous mass. Various types of fibers may be employed as a raw material, including fibers of long staple, such as cotton, hemp, manila, jute, ramie, or the like, and comparatively short-fibered raw materials, including the chemical wood pulps, such as kraft, soda, or sulphite. Long-fibered raw materials are preferable, in that they enhance the strength and tear resistance of the finished product, but uniformity of texture is improved by admixing a certain amount of short-fibered raw material with the long-fibered raw material. When sulphite pulp is used as the raw material, it is sometimes unnecessary to carry out the initial treatment of such fiber with a solution of coagulating agent, as the fiber is sometimes marketed in a sufficiently acid condition to effect the coagulation of rubber from aqueous rubber dispersions with which it comes into contact. This may also be true of other cellulose pulps when they have been bleached with hypochlorite and care has not been exercised in washing or neutralizing the residual bleaching agent, so that a condition of acidity prevails in the bleached fiber. The precipitation of rosin size on the rubberized fibers during the beating operation may be dispensed with, but is desirable in that the precipitated size compounds well with the rubber and serves as a comparatively inexpensive loading material, but other compounding agents, such as waxes, gums, or bitumens, may be compounded with the rubber by adding aqueous dispersions of such agents to the beaten stock and fixing the dispersed particles on the rubber-coated fibers.

One of the advantages of a process such as described is that the rubber component of the finished product is distributed therethrough in such a way as to make possible optimum waterproofing qualities from a given amount of rubber. This is of the highest significance in view of the fact that the rubber component is far more expensive than the fibrous component, and accordingly an increase in the amount of rubber relative to fiber in order to obtain a given waterproofing effect is accompanied by a marked increase in costs. The presence on the fiber surfaces of an agent capable of coagulating rubber from an aqueous rubber dispersion during the treatment with the aqueous rubber dispersion makes possible the desired coating of all the fibers when they are entangled as a mass resembling cotton batting much more quickly than when such an agent is lacking. It is my theory that the rubber initially deposits from the aqueous rubber dispersion on the outer fiber surfaces of such a mass to effect localized reduction in the solids content of the dispersion. This reduction in solids content is evidently accompanied by localized increase in the fluidity of the dispersion so that it passes into the fibrous mass far more quickly, progressively depositing rubber on the uncoated fibers as it passes into the mass and being increasingly lower in solids content until it has uniformly permeated the entire mass. Whether my theory is correct or not, I have observed that a mass of fibers treated with acetic acid as hereinbefore described is much more quickly and uniformly penetrated by latex than a similar mass of fibers in an untreated condition.

By my process, each fiber is completely enveloped in rubber, this condition being clearly observable under the microscope after the drying out of the dispersion-treated fibrous material. During the beating operation the fibers are isolated or individualized, but there is no observable loss of rubber from the fibers, as attested by the distinct clarity of the white water removed during sheet-forming operations. The finished sheet material is thus composed of fibers which are completely enveloped in rubber, but there are practically no rubber aggregates between the fibers, the fibers being bonded together by virtue of their rubber coatings.

I claim:

1. A method which comprises saturating a loose mass of unwoven fibers with an aqueous rubber dispersion, removing excess dispersion from the mass, drying, beating in water to individualize the fibers, and forming the beaten suspension of fibers into the desired article.

2. A method which comprises saturating a loose mass of unwoven fibers with an aqueous rubber dispersion to effect a coagulation of rubber on the fiber surfaces from dispersion only in immediate contact with the fiber, removing excess dispersion from the mass, drying, beating in water to individualize the rubber-coated fibers, and forming the beaten suspension of fibers into the desired article.

3. A method which comprises uniformly treating a loose mass of unwoven fibers carrying on their surfaces an agent capable of coagulating rubber from an aqueous rubber dispersion, treating the mass with sufficient rubber dispersion to effect a coagulation of rubber on substantially all the fiber surfaces, beating the rubber-coated fibers in water to effect their individualization, and forming the aqueous suspension of fiber into the desired article.

4. A method which comprises uniformly saturating a loose mass of unwoven fiber with an aqueous solution of an agent capable of coagulating rubber from an aqueous rubber dispersion, removing excess solution from the mass, saturating with an aqueous rubber dispersion to effect a coagulation of rubber on substantially all the fiber surfaces, removing excess dispersion from the mass, beating the rubber-coated fibers in water to effect their individualization, and forming the aqueous suspension of fibers into the desired article.

5. A method which comprises soaking a loose mass of unwoven fiber in an aqueous solution of acetic acid, removing excess acid from the mass, drying, saturating the dried fiber with latex, removing the excess latex from the mass, drying, beating the dried product in water to effect the individualization of the fibers, and sheeting the aqueous suspension of fiber.

6. A method which comprises associating an aqueous rubber dispersion with a loose mass of fibers capable of coagulating rubber from the dispersion and thereby taking on rubber coatings, beating the rubber-coated fibers in water to effect their individualization, and forming the aqueous suspension of fibers into the desired article.

In testimony whereof I have affixed my signature.

FRANK O. WOODRUFF.